E. HORNER.
Making Flaxseed Oil.
No. 4,961. Patented Feb. 9, 1847.
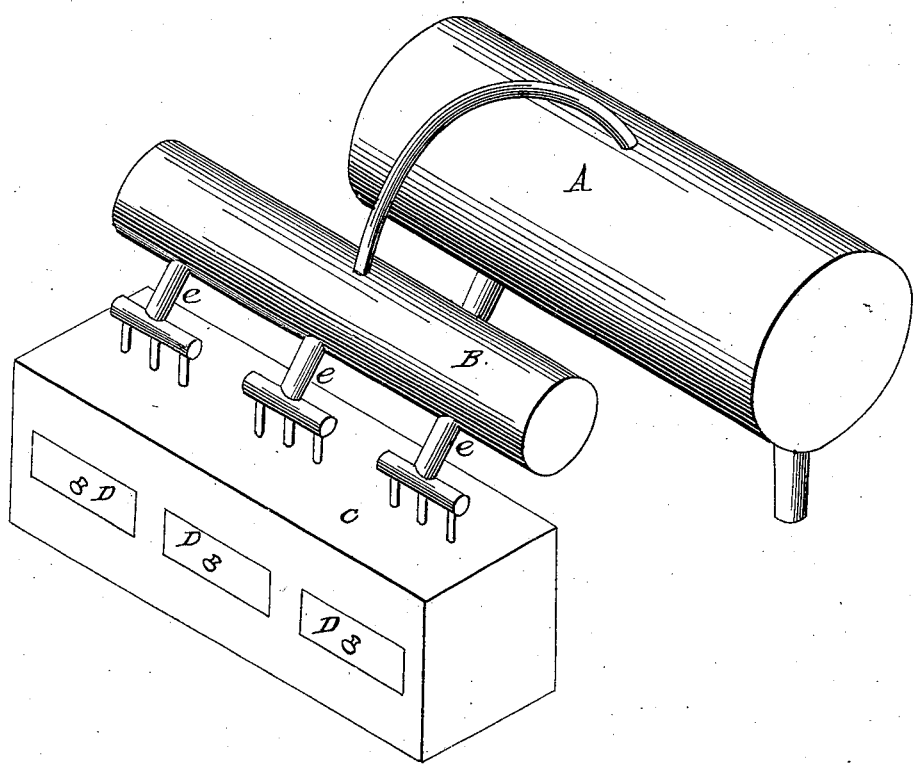

UNITED STATES PATENT OFFICE.

ELIJAH HORNER, OF EAST BROOK, PENNSYLVANIA.

OBTAINING FLAX-SEED OIL.

Specification of Letters Patent No. 4,961, dated February 9, 1847.

*To all whom it may concern:*

Be it known that I, ELIJAH HORNER, of East Brook, in the county of Mercer and State of Pennsylvania, have invented a new and Improved Mode of Preparing the Meal of Flax-Seed and other Oleaginous Seeds for the Purpose of Expressing the Oil, and that the following is a full, clear, and exact description of the principle or character which distinguishes it from all other things before known.

The apparatus used in this process is represented in the accompanying isometrical view.

My invention consists in mixing with the meal of any oleaginous seeds cream of tarter and saleratus in the proportion of half an ounce of the former and one ounce of the latter to a bushel of the ground seed. These ingredients are to be mixed with the meal when dry, and it is then put into a vessel and subjected to a steaming process which separates the oil and allows it to be expressed in the usual way.

The apparatus which may be advantageously used for the steaming process is as follows: to any common steam boiler (A) a steam chamber (B) is attached with which is connected a steam chest (C), said chest may be divided into three or more parts as convenient into each of which a drawer (D) is fitted; from the steam chamber a pipe (e) descends to each of the apartments in the steam chest; said pipes branch into three before they enter the chest, as clearly shown in the drawings, to diffuse the steam more perfectly.

What I claim as my invention and desire to secure by Letters Patent is—

The combination of cream of tarter and saleratus with ground flax seed or other oleaginous seeds previous to the usual process of steaming and then the same, substantially in the manner and for the purpose set forth.

ELIJAH HORNER.

Witnesses:
   JNO. REYNOLDS,
   JONATHAN AYRES.